United States Patent
Dougherty et al.

(10) Patent No.: US 11,889,790 B1
(45) Date of Patent: Feb. 6, 2024

(54) VARIABLE DISPLACEMENT MOTOR CONTROL SYSTEM

(71) Applicant: Dougherty Forestry Manufacturing, Ltd. Co., Hinton, OK (US)

(72) Inventors: Patrick Devon Dougherty, Hinton, OK (US); James Andrew Dougherty, Hinton, OK (US)

(73) Assignee: Dougherty Forestry Manufacturing, Ltd. Co., Hinton, OK (US)

( * ) Notice: Subject to any disclaimer, the term of this patent is extended or adjusted under 35 U.S.C. 154(b) by 162 days.

(21) Appl. No.: 17/196,903

(22) Filed: Mar. 9, 2021

Related U.S. Application Data

(60) Provisional application No. 62/986,974, filed on Mar. 9, 2020.

(51) Int. Cl.
| | |
|---|---|
| *A01D 69/03* | (2006.01) |
| *A01D 34/00* | (2006.01) |
| *A01D 34/60* | (2006.01) |
| *A01G 23/06* | (2006.01) |
| *F15B 7/00* | (2006.01) |

(52) U.S. Cl.
CPC ........... *A01D 69/03* (2013.01); *A01D 34/005* (2013.01); *A01D 34/60* (2013.01); *A01G 23/067* (2013.01); *F15B 7/008* (2013.01)

(58) Field of Classification Search
CPC ......... A01D 69/03; A01D 34/60; F15B 7/008; F15B 2211/7058; F15B 2211/75; F15B 2211/6336; F15B 2211/755; F16H 61/47; F16H 61/46

USPC .......................................................... 60/448
See application file for complete search history.

(56) References Cited

U.S. PATENT DOCUMENTS

| | | | |
|---|---|---|---|
| 6,167,685 B1* | 1/2001 | Berger | A01D 34/006 56/10.2 G |
| 2003/0228893 A1* | 12/2003 | Ho | A01D 41/1274 460/6 |
| 2007/0026910 A1* | 2/2007 | Brome | F16H 61/47 460/6 |
| 2013/0268170 A1* | 10/2013 | Nishi | B60W 10/11 701/60 |
| 2014/0075930 A1* | 3/2014 | Maiyur | F16H 61/462 60/431 |
| 2017/0042084 A1* | 2/2017 | Waitt | A01D 34/006 |
| 2018/0119809 A1* | 5/2018 | Ruxton | F16H 61/47 |
| 2018/0142445 A1* | 5/2018 | Brandt | E02F 9/2242 |
| 2018/0213721 A1* | 8/2018 | Schmoening | A01D 41/1274 |
| 2019/0141897 A1* | 5/2019 | Daining | A01D 69/10 56/11.9 |

(Continued)

*Primary Examiner* — Thomas B Will
*Assistant Examiner* — Julia C Tran
(74) *Attorney, Agent, or Firm* — Crowe & Dunlevy, P.C.

(57) ABSTRACT

A hydraulically powered implement is designed for use in connection with a tractor that has a hydraulic pump that supplies pressurized hydraulic fluid to the implement. The implement includes a variable displacement hydraulic motor, an operative element driven by the hydraulic motor, a speed sensor configured to measure the rotational speed of the operative element and output a speed signal representative of the measured speed, a shift module that adjusts the displacement of the hydraulic motor in response to a shift command signal, and a controller. The controller sends the shift command signal to the shift module in response to speed signal output by the speed sensor.

17 Claims, 4 Drawing Sheets

(56) References Cited

U.S. PATENT DOCUMENTS

2019/0183048 A1\* 6/2019 Flintoft ................ A01D 34/246
2021/0112707 A1\* 4/2021 Fetscher .............. A01B 33/021
2021/0222402 A1\* 7/2021 Zimmerman ........... F15B 7/006

\* cited by examiner

VARIABLE DISPLACEMENT MOTOR CONTROL SYSTEM

RELATED APPLICATIONS

The present application claims the benefit of U.S. Provisional Patent Application Ser. No. 62/986,974 filed Mar. 9, 2020 entitled "Variable Displacement Motor Control System," the disclosure of which is herein incorporated by reference.

FIELD OF THE INVENTION

The present invention generally relates to the control and operation of hydraulic motors.

BACKGROUND OF THE INVENTION

A large variety of tree and brush cutting equipment exists on the market today. These devices range from chainsaws to bulldozers and are each designed to efficiently remove woody vegetation. Recently, compact tractors, track loaders and skid loaders have become popular in forestry management. These vehicles are relatively small and maneuverable and offer a wide range of modular tool attachments.

Tree saws, mulchers and other implements configured for attachment to tractors and skid loaders are often powered with hydraulic motors. The tractor or skid loader includes an internal combustion engine that powers a hydraulic pump that provides pressurized hydraulic fluid. As an example, mulchers have recently been introduced that include a horizontally-mounted drum with cutting teeth that is driven by an attached hydraulic motor. The drum is weighted so that it carries momentum as it is rotated at speed.

To rotate the drum with a relatively small hydraulic pump, the mulcher incorporates a two-speed motor that can be shifted from a first operational mode in which the motor has a larger volume that provides higher torque, lower speed operation to a second operational mode in which the motor has a smaller volume that provides a lower torque, higher speed operation. In these applications, the control of the variable speed motor is based on changes in the hydraulic pressure fed to the motor. The volume of the hydraulic motor is adjusted with a swash plate system that is actuated with a hydraulic cylinder.

As the motor begins to slow down under increased load, the pressure of the hydraulic fluid increases. As the pressure increases, the motor can be automatically or manually shifted into a larger volume operation to increase torque to reduce the deceleration of the rotating drum. Once the drum reaches the maximum operating speed in the large volume mode of operation, the motor can be shifted back to the high-speed, low volume mode of operation to bring the rotational speed of the drum back to the optimal operating speed for cutting trees, brush and other vegetation.

Although generally effective, the motors and control systems used in current implements are slow to respond to changing loads. In some situations, the loads applied to the drum will cause the motor to constantly shift between large volume and small volume modes. If the speed of the drum decreases and the motor shifts to the high-torque mode of operation, the operator must stop feeding the drum and wait for the speed and inertia to build back up. Because the drum is weighted and operates on inertia, these types of devices are not well-suited for smaller tractors, even when a two-speed motor is employed. There is, therefore, a need for an improved hydraulic motor control system for use in connection with an implement driven by a hydraulic pump on a tractor, skid loader or other machine.

SUMMARY OF THE INVENTION

In one aspect, the present disclosure is directed to a hydraulically powered implement for use in connection with a tractor that has a hydraulic pump that supplies pressurized hydraulic fluid to the implement. The implement includes a variable displacement hydraulic motor, an operative element driven by the hydraulic motor, a speed sensor configured to measure the rotational speed of the operative element and output a speed signal representative of the measured speed, a shift module that adjusts the displacement of the hydraulic motor in response to a shift command signal, and a controller. The controller sends the shift command signal to the shift module in response to speed signal output by the speed sensor.

In another aspect, the present disclosure is directed to a hydraulically powered implement for use in connection with a tractor that has a hydraulic pump that supplies pressurized hydraulic fluid to the implement. The implement includes a variable displacement hydraulic motor, a rotating drum driven by the hydraulic motor, a speed sensor configured to measure the rotational speed of the rotating drum and output a speed signal representative of the measured speed, a shift module that adjusts the displacement of the hydraulic motor in response to a shift command signal, and a controller. The controller includes a computer implemented shift control profile that determines the shift command signal which is sent to the shift module in response to speed signal output by the speed sensor.

In yet another aspect, the present disclosure is directed at a method for controlling a variable displacement hydraulic motor that is configured to drive a rotating mulcher drum. The method includes the steps of setting the variable displacement hydraulic motor to an initial displacement volume, activing a hydraulic pump to provide a source of pressurized hydraulic fluid, applying the pressurized hydraulic fluid to the variable displacement hydraulic motor to cause the variable displacement hydraulic motor and rotating mulcher drum to rotate, monitoring a rotational speed of the rotating mulcher drum, and shifting the displacement of the variable displacement motor when the rotational speed of the rotating mulcher drum reaches a predetermined shift point speed.

WRITTEN DESCRIPTION

Figure 1:
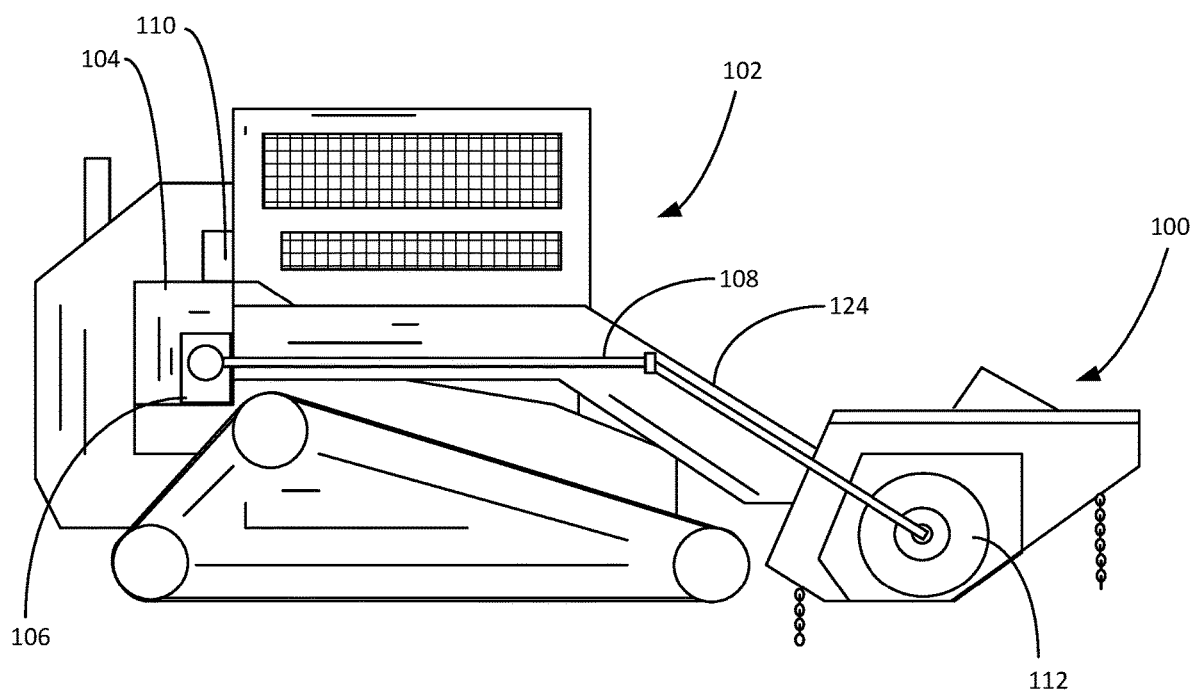
FIG. 1 is a side view of a mulcher constructed in accordance with an exemplary embodiment mounted to a track loader.
Figure 2:
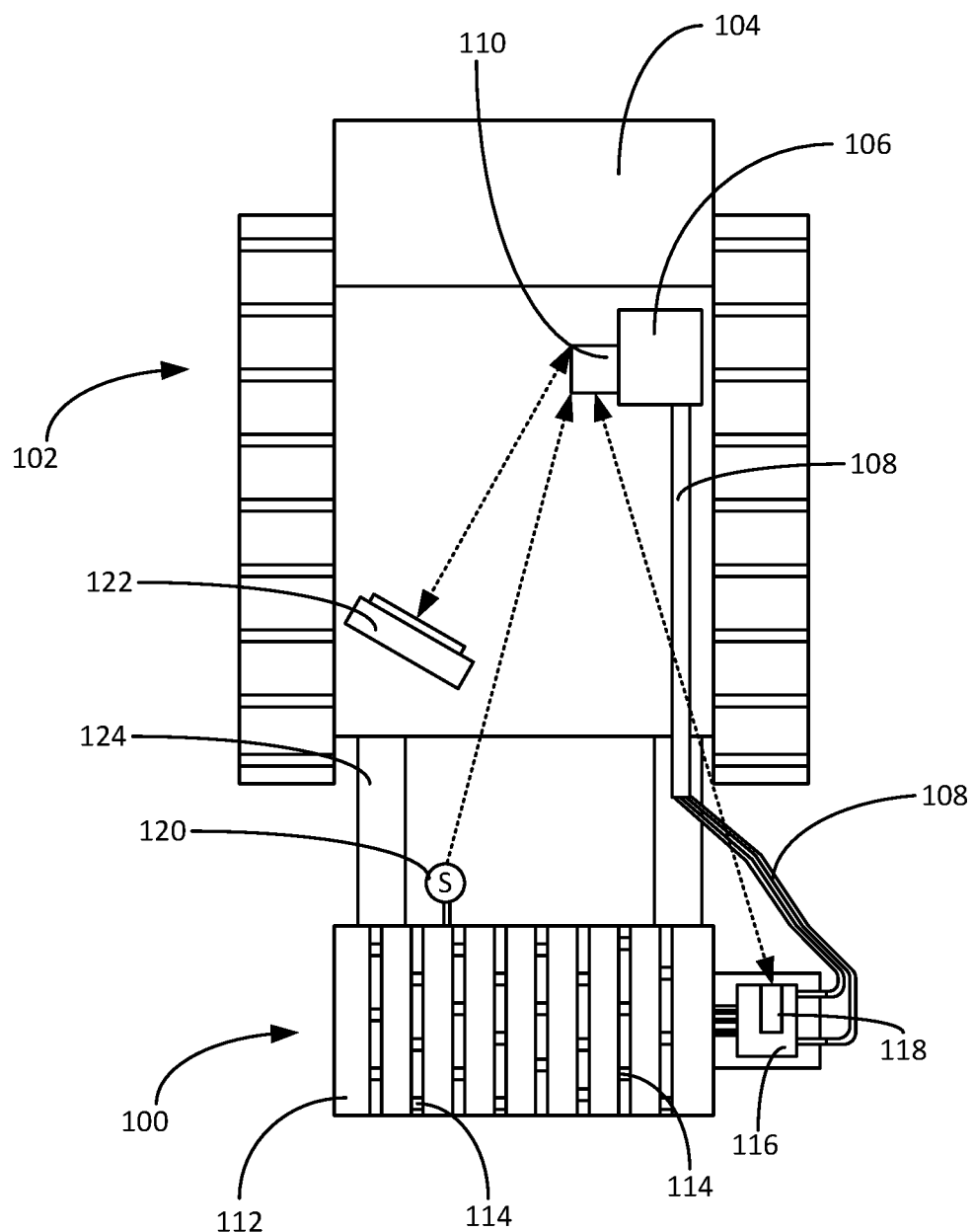
FIG. 2 is a functional depiction of the hydraulic system from the mulcher and track loader of FIG. 1.

Referring to FIGS. 1 and 2, shown therein is a hydraulically-powered implement 100 constructed in accordance with an exemplary embodiment. As depicted, the implement 100 is a mulcher that is generally intended for use in forestry management services that involve felling, grinding and mulching trees, brush and other vegetation. In other embodiments, the implement 100 is a tree saw, feller, or other rotary tool that can be driven by a rotary hydraulic motor.

In exemplary embodiments, the implement 100 is configured for attachment to a tractor 102 that carries the implement 100 and provides a source of pressurized hydraulic fluid to the implement 100. As depicted in FIG. 1, the tractor 102 is a track loader, but it will be appreciated that the tractor 102 can be any suitable prime mover, including for example, skid loaders and compact tractors with front-mounted articulating, hydraulically-powered lift arms 124 capable of safely supporting the weight of the implement 100. It is preferred that the tractor 102 include an operator cabin that shields the operator from debris generated during the operation of the implement 100.

The tractor 102 includes an engine 104, a hydraulic pump 106 driven by the engine 104, hydraulic lines 108 that convey pressurized fluid to and from the hydraulic pump 106, and a computerized controller 110. The engine 104 can be a gas, electric or diesel engine that is sized and configured to drive the hydraulic pump 106. Although a single hydraulic pump 106 is depicted in FIG. 1, it will be appreciated that the tractor 102 may include multiple hydraulic pumps 106, which may be configured to cooperative or dedicated use in powering drive systems (such as wheels or tracks) and the implement 100.

The implement 100 includes an operative element, such as a rotary drum 112 that includes a series of cutting teeth 114. The drum 112 is supported on bearings and driven in rotation by a variable displacement hydraulic motor 116. The motor 116 includes a solenoid-driven shift module 118 that adjusts the displacement of the motor 116 in response to a signal produced by the controller 110. Unlike prior art two-speed motors that are shifted between only two volumes, the displacement of the motor 116 can be adjusted between an infinite number of volumes in response to precise adjustments from the shift module 118. In some embodiments, an increase in voltage applied to the shift module 118 causes a decrease in the displacement of the motor 116, while a decrease in voltage results in an increase in the displacement of the motor 116. Thus, the motor 116 is configured to operate across a continuous range of displacement volumes extending from a minimum displacement volume to a maximum displacement volume.

The shift module 118 is connected via wired or wireless connections to the controller 110. In some embodiments, the controller 110 is configured to operate using Controller Area Network (CAN) or similar established data communication protocols. The controller 110 is configured to provide the shift module 118 with command signals in response to inputs received from the motor 116, the tractor 102 and the drum 112. In particular, the implement 100 is fitted with one or more speed sensors 120 that measure the rotational speed of the drum 112 or other operative element of the implement 100 (e.g., saw blade, mower blade, feller, grinder, etc.). A human interface display panel 122 can be located in the cab of the tractor 102 to provide the operator with real-time information about the operation of the implement 100 and the ability to make adjustments about the status of the implement 100.

The speed sensor 120 provides a signal to the controller 110 that is representative of the instantaneous rotational speed (e.g., in revolutions per minute, RPM) of the drum 112. The speed sensor 120 can be mechanical, hydraulic, optical, magnetic or any other form of sensor that accurately measures the rotational speed of the drum 112 or motor 116.

Although the controller 110 is depicted as being located on the tractor 102, in some embodiments the controller 110 is incorporated within the implement 100 and configured for a data connection to other controllers based on the tractor 110.

Figure 3:
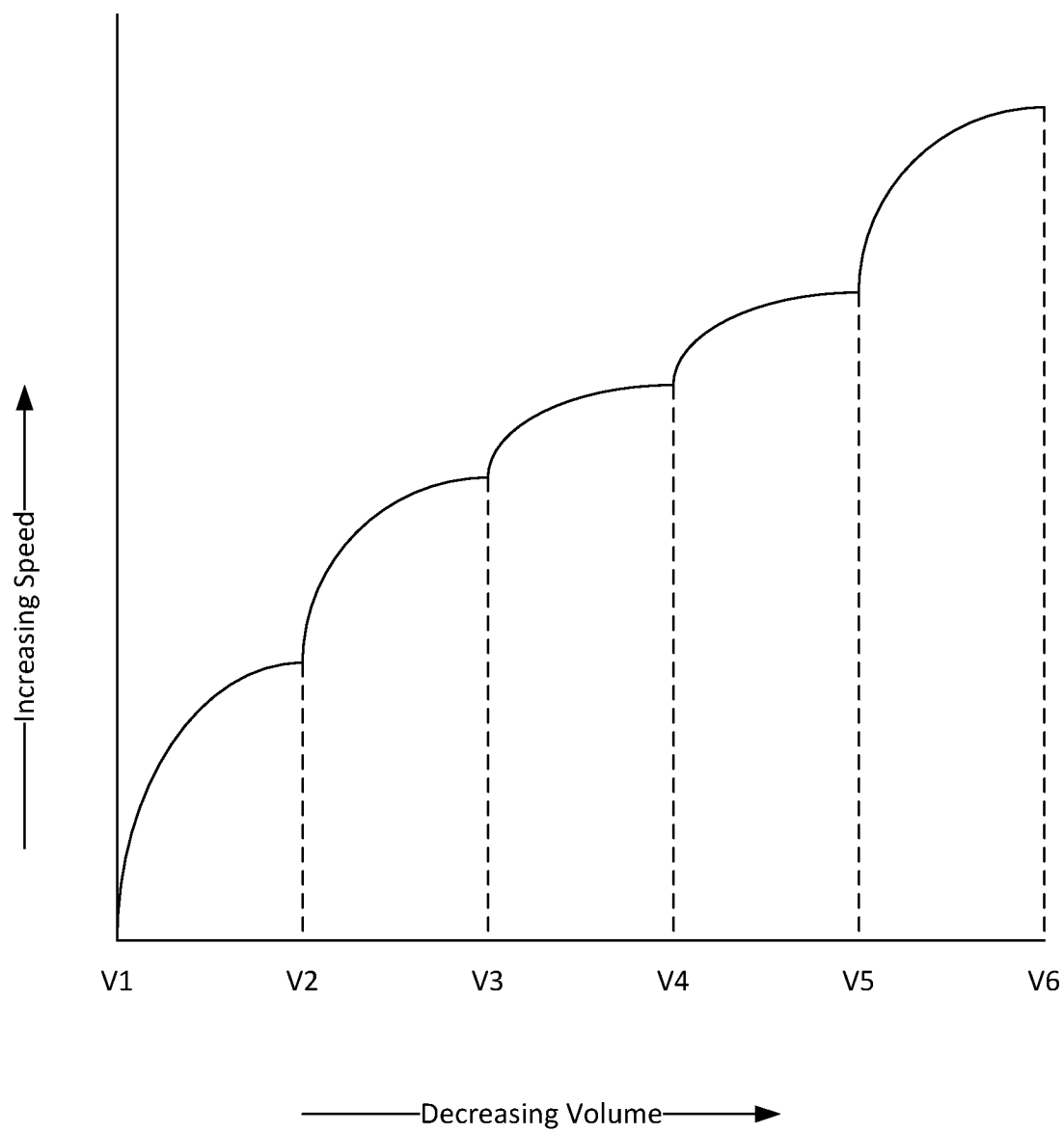
FIG. 3 is a graph of an exemplary shift control profile indicating the changes in motor volume made in response to changes in motor rotational speed.

Unlike prior art systems that rely on a hydraulic pressure-based feedback system, the operation of the motor 116 is adjusted based on the rotational speed of the drum 112. In response to measurements made by the speed sensor 120, the controller 110 shifts the motor between speed-dependent shift points by adjusting the volume of the variable displacement motor 116. An example of a shift control profile is depicted in FIG. 3. As the rotational speed of the motor 116 or drum 112 increases for a given displacement volume of the motor 116, the acceleration begins to decrease as the speed approaches the maximum speed for the flowrate and displacement. The controller 110 then provides a shift command signal to the shift module 118 to decrease the displacement of the motor 116. The motor 116 can then be allowed to further accelerate under the smaller displacement. In this way, the controller 110 can apply shift command signals to the shift module 118 according to a shift control profile to optimize the acceleration of the drum 112 for a given power output from the pump 106. A given shift control profile may include 1, 2, 3, 4, 5, 6, 7, 8, 9, 10 or more shift points. In some embodiments, the shift control profile is configured to be continuously variable so that the displacement of the motor 116 is constantly adjusted in response to changes in the operating state of the motor 116 and drum 112.

The shift points and profiles can be predetermined and programmed into the controller 110, or made adaptive and variable based on control algorithms and schemes implemented into the controller 110 that dynamically determine shift points based on an evaluation of live performance measurements. It will be appreciated that the controller 110 includes basic computing elements (processors, memory, communications modules, displays, etc.) that allow the controller 110 to automatically calculate an output shift command signal based on inputs received from the speed sensor 120 and other sensors on the tractor 102 and implement 100, including for example, sensors that output measurements from the engine 104, hydraulic fluid pressure, and hydraulic fluid temperature.

It has been determined that the relationship between the rotational speed of the drum 112 and the displacement of the motor 116 is non-linear while the motor 116 is under load. In one embodiment of the method for operating the implement 100, the motor 116 is initially controlled so that it stays in the maximum displacement configuration until the rotational speed of the drum 112 reaches the maximum available speed for the output of the hydraulic pump 106. The motor 116 is then shifted by the controller 110 from the maximum displacement configuration to a set point displacement configuration to produce a rotational speed of 2500 RPM under the maximum flow from the pump 106 to establish the "high limit" of the recommended operating range. The voltage applied to the shift module 118 to produce the desired operating speed (e.g., 2500 RPM) is recorded. Thereafter, increasing the displacement of the motor 116 by reducing the voltage applied to the shift module 118 increases the displacement of the motor 116, which tends to increase torque and reduce the rotational speed of the drum 112 under the steady state operation of the pump 106 at a given flow rate. Thus, the voltage applied to the shift module 118 is inversely proportional with the displacement of the motor 116.

As the speed of the drum 112 changes during a load-inducing operation, it becomes beneficial to proactively adjust the displacement of the motor 116 to "catch" the decelerating drum 112 to limit the total deceleration experienced by the drum 112. A rough control scheme could be implemented by simply expressing the instantaneous rotational speed of the drum 112 as a ratio with the maximum speed of 2500 RPM, and then matching the displacement of the motor 116 to the same speed ratio, within the range between the minimum displacement and the maximum displacement. For example, if the drum 112 is decelerating at 2000 RPM (i.e., 80% of maximum speed), the controller 110 could adjust the displacement of the motor 116 to be 80% of maximum displacement.

This method of catching the decelerating drum 112 was found to be insufficient in some circumstances because the adjustments to the displacement of the motor 116 are based on instantaneous and decreasing speed measurements. Increasing the displacement of the motor 116 too rapidly can cause the motor 116 to further decelerate, which can result in runaway control profile that forces the motor 116 to quickly reach its maximum displacement (and slowest speed).

A more effective control scheme can be implemented by decreasing the rate at which the displacement in the motor 116 is enlarged in response to a reduction in the speed of the drum 112. The controller 110 can be configured to set the displacement of the motor 116 at an amount that is smaller than the linear equivalent by an "additional factor." For example, the controller 110 can be configured to adjust the displacement of the motor 116 such that it is 30% smaller than the linear equivalent size based on the corresponding rotational speed of the drum 112. Thus, when the drum 112 is decelerating at 2000 RPM from a maximum speed of 2500 RPM, the controller 110 would initially determine that the motor 116 should be shifted to 80% of maximum speed displacement (i.e., the linear equivalent) which is then modified by the additional factor to reduce the displacement of the motor 116. This can be accomplished by increasing the voltage applied to the shift module 118 by an additional factor beyond the voltage that would correlate to the linearly proportional equivalent voltage.

The additional factor can change across the operating range of the motor 116. In some embodiments, it has been found that below about 1800 RPM, the additional factor should be about 18% more voltage than would be applied to the shift module 118 for the linear equivalent for the given rotational speed. Above about 1800 RPM, the additional factor could be about 30% more voltage than would be applied to the shift module for the baseline linear equivalent for the given rotational speed.

As an example, the drum 112 and motor 116 can be configured for operation at an optimum working speed of 2500 RPM, where the displacement of the motor 116 is set by a shift control voltage of 50 volts at the shift module 118. If the drum 112 decelerates to 1500 RPM under load, the linearly proportional displacement would be 60% of maximum speed displacement, which would roughly translate into a voltage of about 30 volts at the shift module 118 (60% of 50 volts). To prevent the motor 116 from enlarging too rapidly, the voltage applied to the shift module 118 during this speed recovery process should be greater than 30 volts. As indicated above, a voltage of between about 35.4 volts (18% greater) and about 39 volts (30% greater) would prevent the motor 116 from enlarging too rapidly.

Figure 4:
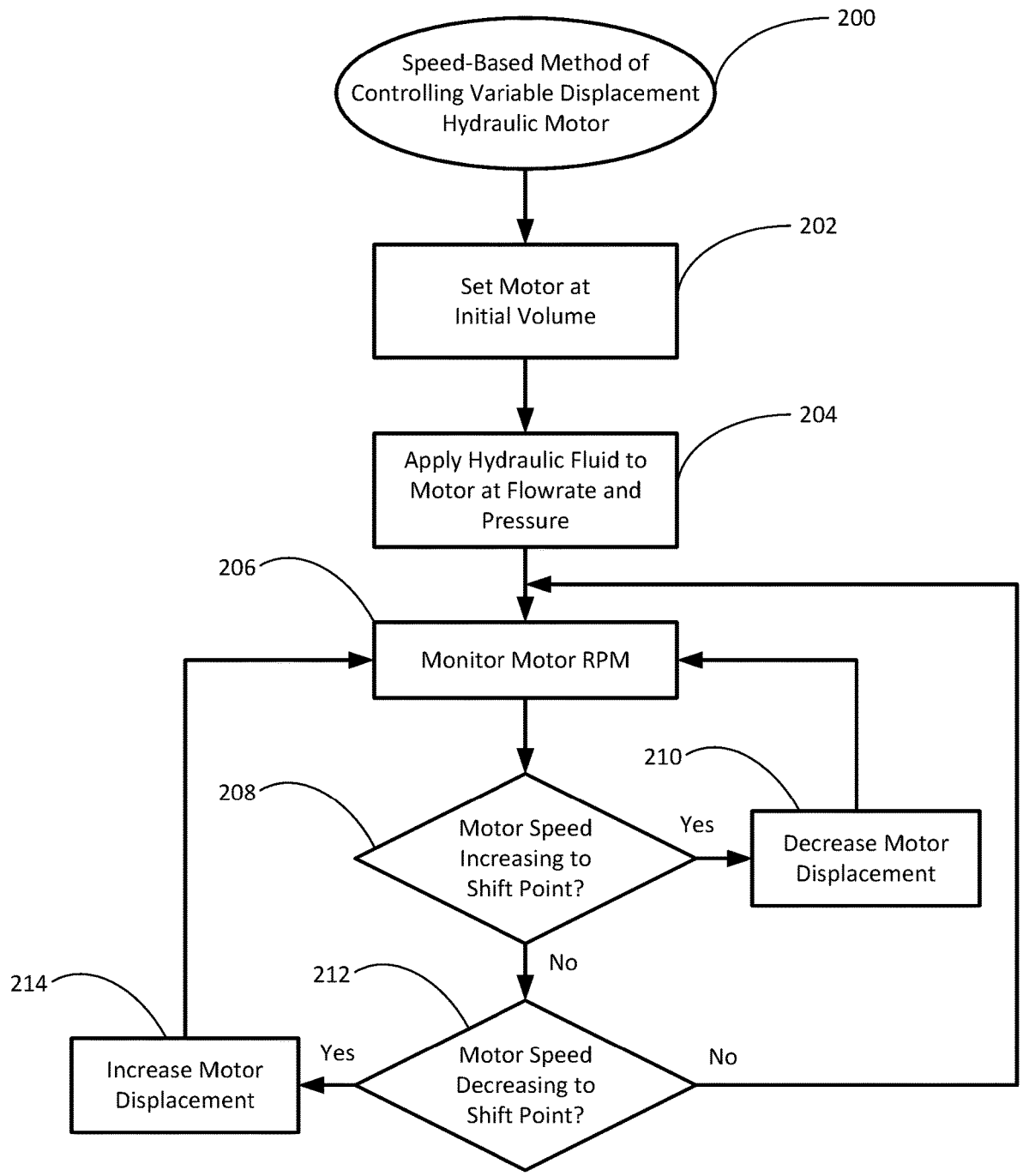
FIG. 4 is a process flow diagram for a method of controlling the operation of the variable displacement hydraulic motor.

Turning to FIG. 4, shown therein is an exemplary method 200 for carrying out a speed-based operation of the variable displacement hydraulic motor 116. At step 202, the motor 116 is placed in a first mode of operation by the controller 110 when the drum 112 is stationary. In this first mode of operation, the motor 116 can be placed in the maximum displacement configuration that produces the maximum torque for a given flowrate of hydraulic fluid from the hydraulic pump 106. At step 204, the pump 106 delivers pressurized hydraulic fluid to the motor 116 to initiate rotation of the drum 112. The rotational speed of the drum 112 is monitored at step 206. The speed sensor 120 can be configured to periodically poll the speed of the drum 112 or provide a continuous measurement of the speed of the drum 112.

At step 208, the current speed of the drum 112 is compared by the controller 110 against the shift command profile that includes one or more shift points that are correlated to a rotational speed of the drum 112. If the measured speed of the motor 116 or drum 112 increases to the applicable shift point, the process moves to step 210 where the controller 110 sends a shift command signal to the shift module 118 to decrease the displacement of the motor 116. The process returns to step 206, where the speed of the drum 112 is monitored. The controller 110 will continue to reduce the displacement of the motor 116 until the last shift point is reached within the shift control profile.

If the motor speed is not increasing to a shift point at step 208, the controller 110 determines if the motor speed is decreasing to a shift point at step 212. During use, the drum 112 may decelerate under load as it is pushed into vegetation. If the speed of the motor 116 or drum 112 is decreasing to a shift point within the shift control profile, the controller 110 sends a command signal to the shift module 118 to increase the displacement within the motor 116. This increases the torque produced by the motor 116 to allow the motor 116 to more easily accelerate back to a desired operating speed. It will be appreciated that steps 208 and 212 can be arranged so that steps 212 and 214 occur before steps 208 and 210. It will also be appreciated that in practice all of these steps can be combined into a single step.

In another embodiment, the controller 110 is configured to proactively adjust the displacement of the motor 116 before output from the pump 106 is partially diverted to other systems on the tractor 102. For example, when the tractor 102 diverts hydraulic fluid from the implement 100 to expand the lift cylinders for the tractor arms 124, the hydraulic fluid available to the implement 100 can be reduced by up to 40%, thus causing the drum 112 to slow down. The controller 110 is configured to detect the initial deceleration and loss of hydraulic pressure as an indicator that the arms 124 are beginning to divert fluid. To prevent the unwanted deceleration of the drum 112, the controller 110 reduces the displacement of the hydraulic motor 116 by 40%. This saves time because the operator will not have to wait while the drum regains speed once the arms 124 are lifted.

In addition to permitting the advanced control of the motor 116 and drum 112, the controller 110 is also useful in providing the operator with additional feedback and information about the implement 100 that is not available under prior art systems. For example, the controller 110 can be configured to monitor the volumetric flow rate of the pump 106 directed at the motor 116 based on the rotational speed of the motor 116. The controller 110 can be configured to provide a graphical display of the flow rate from the pump 106 to the motor 116 on the human interface display panel 122. Similarly, the controller 110 and human interface display panel 122 can be configured to provide a total operating time for the implement 100, which is independent from the total operating time of the tractor 102 or pump 106. The same functionality can be extended to provide the operator with information on recommended service intervals for the implement 100. For example, the controller 110 and human interface display panel 122 can be configured to advise the operator that the teeth on the drum 112 should be replaced after a predetermined operating period has been reached (e.g., after 400 hours of operation).

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein and within the appended claims. It will be appreciated by those skilled in the art that the teachings of the present invention can be applied to other systems without departing from the scope and spirit of the present invention.

It is claimed:

1. A hydraulically powered implement for use in connection with a tractor that has a hydraulic pump that supplies pressurized hydraulic fluid to the implement, the implement comprising:
    a variable displacement hydraulic motor that has a maximum speed, a maximum speed displacement volume, and a minimum speed displacement volume;
    an operative element driven by the hydraulic motor;
    a speed sensor configured to measure the rotational speed of the operative element and output a speed signal representative of the measured speed;
    a shift module that adjusts the displacement volume of the hydraulic motor in response to a shift command signal; and
    a controller, wherein the controller sends the shift command signal to the shift module in response to the speed signal output by the speed sensor when the measured speed is less than the maximum speed and the rotational speed of the operative element is decreasing, wherein the shift command signal sets the hydraulic motor at an adjusted displacement volume that is smaller than a linearly equivalent displacement volume, where the linearly equivalent displacement volume is the displacement volume between the maximum speed displacement volume and the minimum speed displacement volume that linearly corresponds to a ratio of the measured speed between the maximum speed and the minimum speed.

2. The hydraulically powered implement of claim 1, wherein the variable displacement hydraulic motor is configured to operate in a plurality of displacement volumes.

3. The hydraulically powered implement of claim 2, wherein the variable displacement hydraulic motor is configured to operate in more than two displacement volumes.

4. The hydraulically powered implement of claim 3, wherein the variable displacement hydraulic motor is configured to operate across a continuous range of displacement volumes between a minimum displacement volume and a maximum displacement volume.

5. The hydraulically powered implement of claim 1, wherein the speed sensor is configured to measure the rotational speed of the operative element and a rotational speed of the variable displacement hydraulic motor.

6. The hydraulically powered implement of claim 1, further comprising a second speed sensor and wherein the second speed sensor is configured to measure the rotational speed of the operative element and a rotational speed of the variable displacement hydraulic motor.

7. The hydraulically powered implement of claim 1, wherein the adjusted displacement volume of the hydraulic motor is about 18% smaller than the linearly equivalent displacement volume when the measured speed is less than about 1800 RPM.

8. The hydraulically powered implement of claim 1, wherein the controller includes a computer implemented shift control profile includes a plurality of computer-implemented shift points.

9. The hydraulically powered implement of claim 1 the adjusted displacement volume of the hydraulic motor is about 30% smaller than the linearly equivalent displacement volume when the measured speed is greater than about 1800 RPM.

10. The hydraulically powered implement of claim 8, wherein at least one of the plurality of computer implemented shift control profiles is adaptive and updated during the operation of the hydraulically powered implement.

11. A hydraulically powered implement for use in connection with a tractor that has a hydraulic pump that supplies pressurized hydraulic fluid to the implement, the implement comprising:
    a variable displacement hydraulic motor that has a desired operating speed, a maximum displacement volume and a minimum displacement volume;
    a rotating drum driven by the hydraulic motor;
    a speed sensor configured to measure the rotational speed of the rotating drum and output a speed signal representative of the measured speed;
    a shift module that adjusts the displacement of the hydraulic motor in response to a shift command signal voltage, wherein increasing the shift command signal voltage decreases the displacement of the hydraulic motor and decreasing the shift command signal voltage increases the displacement of the hydraulic motor; and
    a controller, wherein the controller includes a computer implemented shift control profile that determines the shift command signal voltage which is sent to the shift module in response to the speed signal output by the speed sensor indicating the measured speed is less than the desired operating speed and the rotational speed of the drum is decreasing, wherein the shift command signal voltage is adjusted to a shift command signal voltage that is larger than a linearly proportional equivalent voltage, where the linearly proportional equivalent voltage is the shift command signal voltage that produces a displacement volume between the maximum displacement volume and the minimum displacement volume that linearly corresponds to a ratio of the measured speed to the desired operating speed.

12. The hydraulically powered implement of claim 11, wherein the variable displacement hydraulic motor is configured to operate in more than two displacement volumes.

13. The hydraulically powered implement of claim 12, wherein the variable displacement hydraulic motor is configured to operate across a continuous range of displacement volumes between the minimum displacement volume and the maximum displacement volume.

14. A method for controlling a variable displacement hydraulic motor that is configured to drive a rotating mulcher drum suspended on lifting arms of a tractor, wherein the variable displacement hydraulic motor has a desired operating speed, a maximum displacement volume, a minimum displacement volume, and a total displacement volume between the maximum displacement volume and the minimum displacement volume, the method comprising the steps of:
- setting the variable displacement hydraulic motor to an initial displacement volume;
- activating a hydraulic pump to provide a source of pressurized hydraulic fluid;
- applying the pressurized hydraulic fluid to the variable displacement hydraulic motor to cause the variable displacement hydraulic motor and rotating mulcher drum to rotate;
- monitoring a rotational speed of the rotating mulcher drum; and
- shifting the displacement of the variable displacement motor when the rotational speed of the rotating mulcher drum decelerates from the desired operating speed, wherein the step of shifting the displacement of the variable displacement motor further comprises:
  - determining a linearly equivalent displacement volume by:
    - finding a speed ratio by applying a ratio of the rotational speed of the rotating mulcher drum to the desired operating speed; and
    - applying the speed ratio to the total displacement volume; and
  - shifting the variable displacement motor to a displacement volume that is smaller than the linearly equivalent displacement volume.

15. The method of claim 14, wherein the step shifting the displacement of the variable displacement motor further comprises shifting the variable displacement motor to a displacement volume that is about 18% smaller than the linearly equivalent displacement volume when the rotational speed of the rotating mulcher drum is less than about 1800 RPM.

16. The method of claim 14, wherein the step shifting the displacement of the variable displacement motor further comprises shifting the variable displacement motor to a displacement volume that is about 30% smaller than the linearly equivalent displacement volume when the rotational speed of the rotating mulcher drum is greater than about 1800 RPM.

17. The method of claim 14, further comprising the step of reducing the displacement of the variable displacement motor when the lifting arms of the tractor are raised.

* * * * *